(12) United States Patent
Bhat et al.

(10) Patent No.: US 11,990,957 B2
(45) Date of Patent: May 21, 2024

(54) DYNAMIC MU-MIMO LAYER LIMIT CONTROL

(71) Applicant: Telefonaktiebolaget LM Ericsson (publ), Stockholm (SE)

(72) Inventors: Harish Venkatraman Bhat, Hjärup (SE); Ahmedul Quadir, Sollentuna (SE); Stefan Tjärnlund, Järfälla (SE); Mats Johansson, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 17/622,169

(22) PCT Filed: Jun. 26, 2019

(86) PCT No.: PCT/EP2019/067005
§ 371 (c)(1),
(2) Date: Dec. 22, 2021

(87) PCT Pub. No.: WO2020/259821
PCT Pub. Date: Dec. 30, 2020

(65) Prior Publication Data
US 2022/0399919 A1   Dec. 15, 2022

(51) Int. Cl.
*H04B 7/0452* (2017.01)
*H04B 7/0456* (2017.01)
*H04B 17/336* (2015.01)

(52) U.S. Cl.
CPC ......... *H04B 7/0473* (2013.01); *H04B 7/0452* (2013.01); *H04B 17/336* (2015.01)

(58) Field of Classification Search
None
See application file for complete search history.

(56) References Cited

U.S. PATENT DOCUMENTS 8,594,132 B2 * 11/2013 Sunay ............... H04W 72/543
370/477
2007/0183380 A1   8/2007 Rensburg et al.
2014/0078997 A1   3/2014 Zhang et al.

FOREIGN PATENT DOCUMENTS

KR           101868557 B1    7/2018

* cited by examiner

*Primary Examiner* — Minh Trang T Nguyen
(74) *Attorney, Agent, or Firm* — COATS & BENNETT, PLLC

(57) ABSTRACT

To perform wireless communication scheduling, a network node (700) calculates a corresponding layer limit for each of a plurality of scheduling intervals of a cell (20) served to a plurality of user equipment via multi-user multiple-input multiple-output (MU-MIMO). The network node (700) schedules time-frequency resource utilization such that, for each of the scheduling intervals, no time-frequency resource is scheduled for use by more of the UEs (200) than the layer limit corresponding to the scheduling interval.

21 Claims, 20 Drawing Sheets

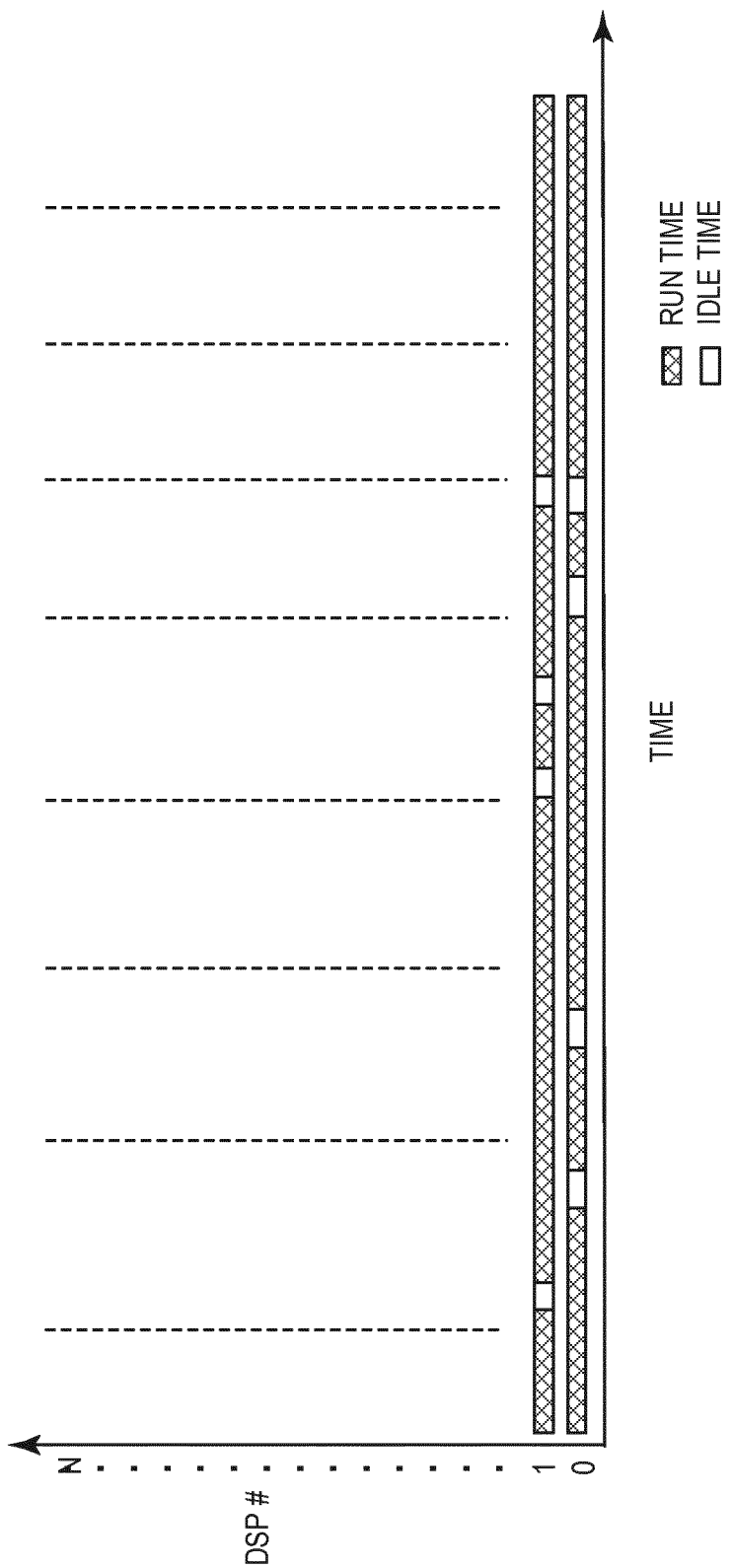

| MU GROUP | NUMBER OF LAYERS | CC (CHANNEL CAPACITY) |
|---|---|---|
| $MU_{m6}$ | 6 | $avgCC_6$ |
| $MU_{m8}$ | 8 | $avgCC_8$ |
| ... | ... | ... |
| $MU_{m5}$ | 5 | $avgCC_5$ |

HIGHEST avgCC → LOWEST avgCC

*FIGURE 7*

DYNAMIC MU-MIMO LAYER LIMIT CONTROL

TECHNICAL FIELD

The present disclosure generally relates to the field of wireless communication networks, and more particularly to multi-user multiple-input multiple-output (MU-MIMO) technologies.

BACKGROUND

Multiple-input multiple-output (MIMO) is a wireless communication technology in which multiple antennas are used to exchange signals with another wireless communication device (e.g., a user equipment (UE)). Beamforming (BF) is a technique in which the energy of a transmitted signal is directed towards a specific UE or other wireless communication device by producing constructive interference from the antennas at certain angles (e.g., by transmitting the same stream of data from multiple antennas at a controlled amount of phase shift). Correspondingly, the energy received by the multiple antennas may be constructively combined at controlled amounts of phase shift in a beamforming receiver (i.e., to improve reception at a particular angle from the receiver). Massive beamforming is a wireless communication technology that takes advantage of multiple antenna systems.

In order to direct energy towards the communication device, signals are multiplied with channel dependent antenna weights before transmitting from each antenna. The channel dependent antenna weights are calculated using channel state information.

To increase capacity, multiple data streams (i.e., layers) may be transmitted on the same time-frequency resources from one or more of the antennas and sent to one or more communication devices. When the multiple layers are directed to a single device, this is generally referred to single user MIMO. When different layers are directed to different devices, this is generally referred to as MU-MIMO.

The number of layers in an MU-MIMO group defines the number of UEs that can use the same time-frequency resource at any given point of time. Those UEs that use the same time-frequency resource are traditionally referred to as being part of the same MU-MIMO group. MU-MIMO systems with a relatively high number of layers typically have greater capacity within the cell, while also having exponentially higher processing complexity in order to transmit and/or receive. Correspondingly, MU-MIMO systems having a relatively low number of layers typically have a lower processing burden, but less cell capacity.

SUMMARY

Embodiments of the present disclosure dynamically vary the layer limit in a cell, e.g., depending on the processing load on the system and/or the previous history of channel capacity for different number of layers.

Particular embodiments include a method of wireless communication scheduling implemented by a network node. The method comprises calculating a corresponding layer limit for each of a plurality of scheduling intervals of a cell served to a plurality of UEs via MU-MIMO. The method further comprises scheduling time-frequency resource utilization such that, for each of the scheduling intervals, no time-frequency resource is scheduled for use by more of the UEs than the layer limit corresponding to the scheduling interval.

In some embodiments, calculating the corresponding layer limit of a given scheduling interval of the plurality of scheduling intervals comprises determining, for each of one or more of the scheduling intervals previous to the given scheduling interval, a corresponding hardware utilization of the network node during the previous scheduling interval. In some such embodiments, calculating the corresponding layer limit of the given scheduling interval comprises taking a running average of at least a subset of the hardware utilizations corresponding to the previous scheduling intervals. For example, in some such embodiments, calculating the corresponding layer limit of the given scheduling interval comprises omitting, from the running average of the hardware utilizations, each of the hardware utilizations that are below a minimum threshold and which correspond to a different one or more of the previous scheduling intervals.

In some embodiments, calculating the corresponding layer limit of the given scheduling interval comprises incrementing the layer limit corresponding to the scheduling interval immediately previous to the given scheduling interval by a predefined step size in response to the running average of the hardware utilizations being below a cost threshold. In other embodiments, calculating the corresponding layer limit of the given scheduling interval comprises decrementing the layer limit corresponding to the scheduling interval immediately previous to the given scheduling interval by a predefined step size in response to the running average of the hardware utilizations being above a cost threshold. In yet other embodiments, calculating the corresponding layer limit of the given scheduling interval comprises maintaining the layer limit corresponding to the scheduling interval immediately previous to the given scheduling interval in response to the running average of the hardware utilizations being above a first cost threshold and below a second cost threshold.

In some embodiments, determining the corresponding hardware utilization of at least one of the previous scheduling intervals comprises determining a run time and/or load time of a digital signal processor of the network node.

In some embodiments, determining the corresponding hardware utilization of at least one of the previous scheduling intervals comprises summing run times and load times of a plurality of digital signal processors of the network node.

In some embodiments, calculating the corresponding layer limit of a given scheduling interval of the plurality of scheduling intervals comprises determining a channel capacity of a MU-MIMO group. In some such embodiments, determining the channel capacity of the MU-MIMO group comprises determining a signal to noise ratio (SINR) for each layer of the MU-MIMO group. For example, in some such embodiments, determining the channel capacity of the MU-MIMO group further comprises determining a capacity of each layer of the MU-MIMO based on the SINR of the layer.

In some embodiments, determining the channel capacity of the MU-MIMO group comprises calculating a capacity for each of one or more scheduling intervals previous to the given scheduling interval, and taking a running average of the capacities. In some such embodiments, determining the channel capacity of the MU-MIMO group comprises storing the running average in association with the MU-MIMO group and number of layers in the MU-MIMO group in a database of average channel capacities and respective MU- MIMO groups, comparing the running average of the MU-MIMO group to the average channel capacities of the other MU-MIMO groups, and identifying the running average as the highest of the channel capacities in the database.

In some embodiments, calculating the corresponding layer limit of a given scheduling interval of the plurality of scheduling intervals comprises determining a cost-based layer limit and a capacity-based layer limit, selecting the lesser of the cost-based and capacity-based layer limits as the layer limit corresponding to the given scheduling interval.

In some embodiments, the scheduling interval is one slot in duration. In some other embodiments, the scheduling interval is one subframe in duration.

In some embodiments, the plurality of scheduling intervals are contiguous. In other embodiments, the plurality of scheduling intervals are discontiguous.

Other embodiments include a network node. The network node is configured to calculate a corresponding layer limit for each of a plurality of scheduling intervals of a cell served to a plurality of UEs via MU-MIMO, and schedule time-frequency resource utilization such that, for each of the scheduling intervals, no time-frequency resource is scheduled for use by more of the UEs than the layer limit corresponding to the scheduling interval.

In some embodiments, the network node comprises processing circuitry and memory. The memory contains instructions executable by the processing circuitry whereby the network node is configured as described above.

In some embodiments, the network node is further configured to perform any of the methods described above, or otherwise described herein.

Yet other embodiments include a computer program comprising instructions which, when executed on processing circuitry of a network node, cause the processing circuitry to carry out any of the methods described above, or otherwise described herein.

Yet other embodiments include a carrier containing such a computer program. The carrier is one of an electronic signal, optical signal, radio signal, or computer readable storage medium. For example, in some embodiments the carrier is a non-transitory readable medium.

BRIEF DESCRIPTION OF THE DRAWINGS

Aspects of the present disclosure are illustrated by way of example and are not limited by the accompanying figures with like references indicating like elements.

FIG. 5 is a graph illustrating busy and idle times of digital signal processors processing a baseband signal, according to one or more embodiments of the present disclosure.

FIG. 7 is a table illustrating an example of channel capacity database entries, according to one or more embodiments of the present disclosure.

DETAILED DESCRIPTION

Figure 1:
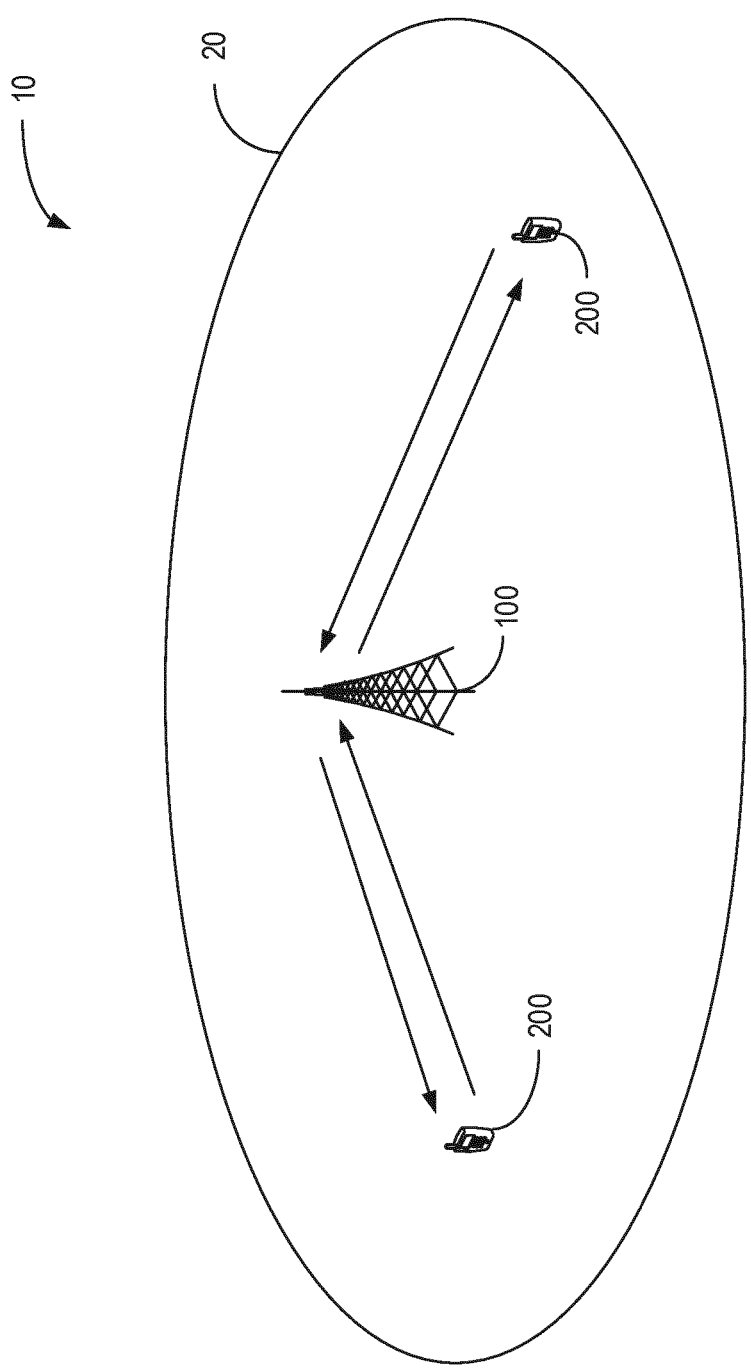
FIG. 1 is a schematic block diagram illustrating an example wireless communication network, according to one or more embodiments of the present disclosure.

Referring now to the drawings, example embodiments of the present disclosure will be described in the context of a Fifth Generation (5G) or New Radio (NR) wireless communication network. The features of particular embodiments herein described are not limited to use in 5G or NR networks however. Rather, aspects of the various embodiments may also be used in other wireless communication networks (e.g., Long Term Evolution (LTE)) in which multiple beams within a single cell are used for communication with wireless devices in the cell.

FIG. 1 illustrates a wireless communication network 10 according to the NR standard currently being developed by Third Generation Partnership Project (3GPP). The wireless communication network 10 comprises one or more network nodes (e.g., one or more base stations 100) providing respective cells 20 of the wireless communication network 10 to one or more UEs 200 in the cell. The base station 100 transmits to one or more UEs 200 on the downlink (e.g., on a beam, not shown), and receives transmissions from one or more UEs 200 on the uplink (e.g., on a beam, not shown). As will be discussed in greater detail below, the base station 100 can measure the uplink signal strength or signal quality, e.g., in terms of Signal to Noise Ratio (SINR).

The base stations 100 may also be referred to as Evolved NodesBs (eNBs) and Fifth Generation (5G) NodeBs (gNBs) in 3GPP standards. Although only one cell 20 and one base station 100 are shown in FIG. 1, those skilled in the art will appreciate that a typical wireless communication network 10 comprises many cells 20 served by many base stations 100.

The UEs 200 may comprise any type of equipment capable of communicating with the base station 100 over a wireless communication channel. For example, the UEs 200 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
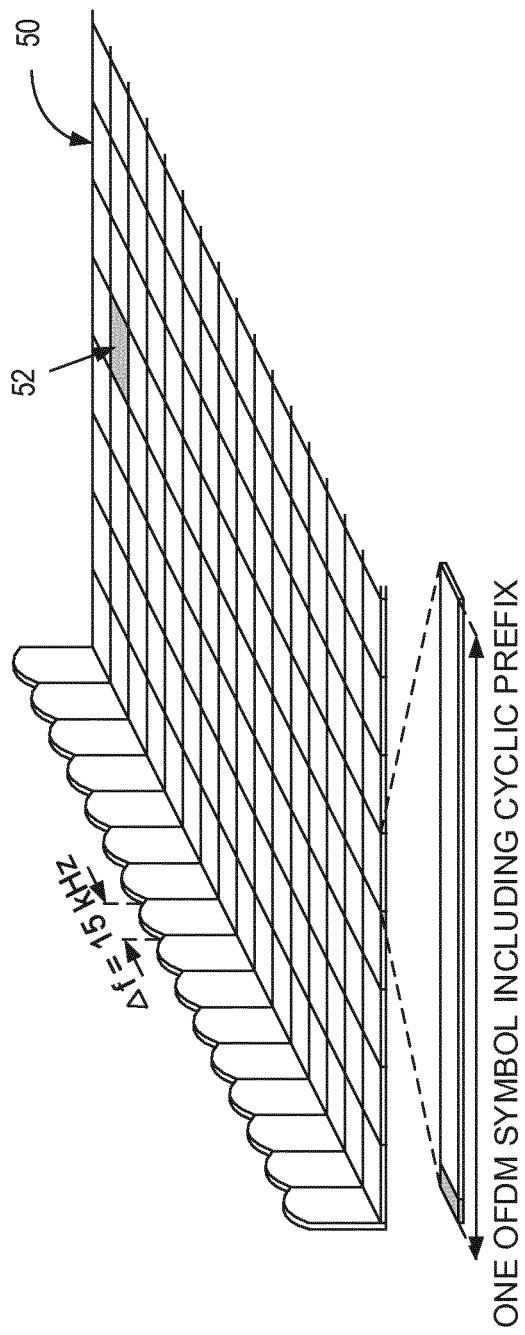
FIG. 2 is a schematic block diagram illustrating an example of radio resources, according to one or more embodiments of the present disclosure.

The radio resources in NR can be viewed as a time-frequency grid 50 as shown in FIG. 2. In the time domain, the physical resources are divided into slots. Each slot includes a number of symbols. In one embodiment, a slot comprises 7 or 14 orthogonal frequency division multiplexing (OFDM) symbols for subcarrier spacing (SCS) less than or equal to 60 kHz, and 14 OFDM symbols for SCS greater than 60 kHz. In the frequency domain, the physical resources are divided into subcarriers. The number of subcarriers varies according to the allocated system bandwidth. In NR, a slot can be subdivided into mini-slots. A mini-slot comprises one or more symbol periods in a time slot. The smallest element of the time-frequency grid 50 is a resource element (RE) 52, which comprises the intersection of one subcarrier and one symbol.

In many non-NR networks that similarly use a time-frequency grid 50 of resources, a subframe typically comprises fourteen symbols and a normal Cyclic Prefix (CP) length. Such a subframe is generally suitable for use in situations where multipath dispersion is not expected to be severe. Under more severe multipath dispersion scenarios, an extended CP may be used, in which case the subframe typically comprises twelve symbols instead.

Figure 3:
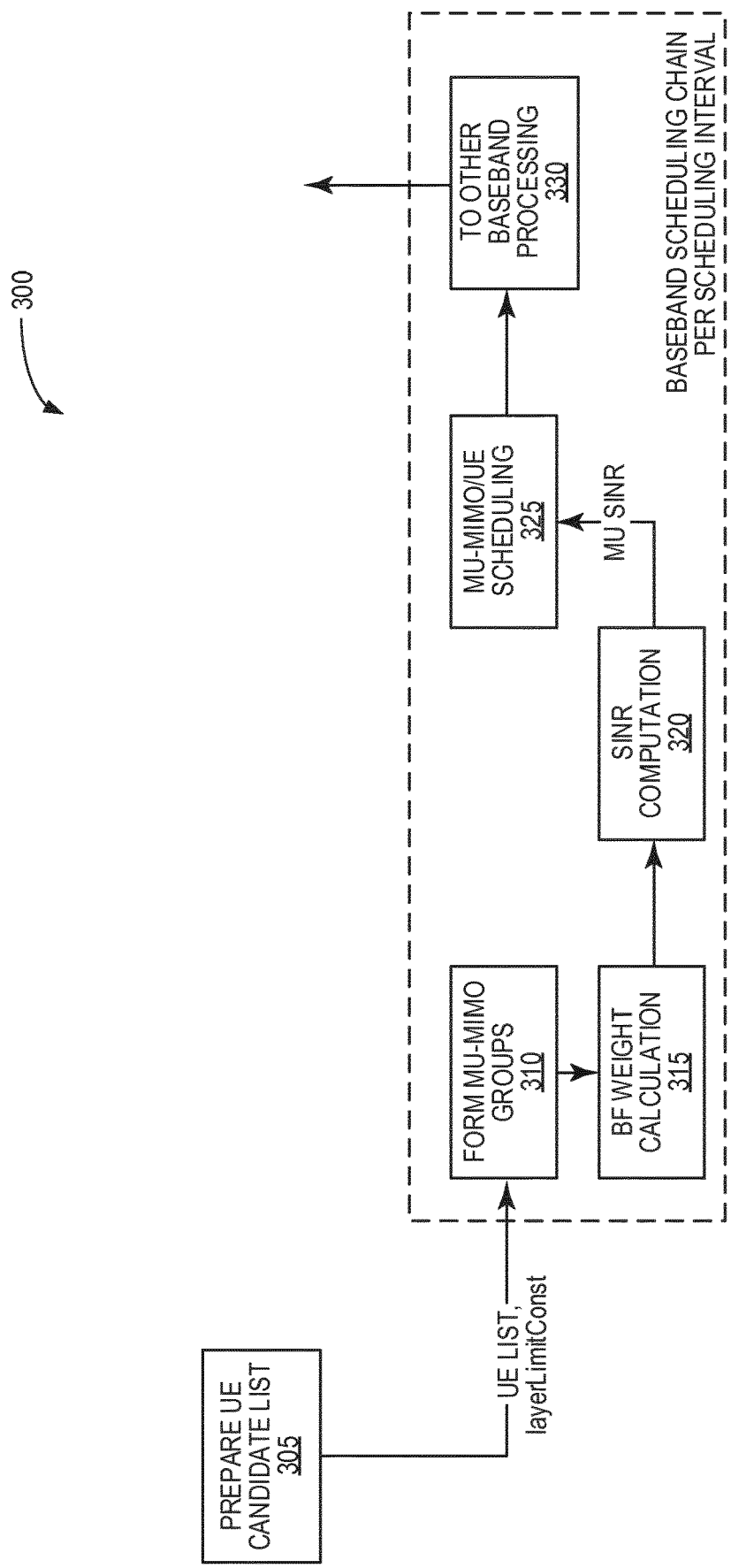
FIGS. 3 and 4 are flow diagrams illustrating an example scheduling flows, according to one or more embodiments of the present disclosure.

The scheduling for the communication network 10 is done every scheduling interval (e.g., every subframe or slot). FIG. 3 illustrates an example scheduling flow 300 of the communication network 10. According to this example, a list of candidate UEs 305 for scheduling is prepared (block 305), and for each scheduling interval, scheduling mainly consists of forming one or more MU-MIMO groups (block 310), performing BF weight calculations (block 315), performing SINR calculations (block 320), scheduling the MU-MIMO and other UEs 200 (block 325), and performing other remaining baseband processing (block 330).

The processing complexity of calculating the BF weights & SINRs grows exponentially with the number of layers in the MU group. Accordingly, there is a need to limit the number of layers in the MU group for a given cell 20. This maximum number of layers for a given cell 20 is represented by the parameter name layerLimitConst, which is an input to the MU-MIMO group formation step and impacts the BF weight computation.

In this particular example, the layer limit is a system constant that is fixed during cell setup. In such an example, the layer limit cannot be changed while the cell 20 is active. Accordingly, during a cell overload scenario, it is possible that the MU-MIMO layer limit cannot be supported given the amount of processing resources that are available. Notwithstanding, the MU-MIMO processing software may try to meet the layer limit regardless, thereby putting extra load on base station hardware. Further, during other scenarios in which load on the hardware is less, the hardware may be underutilized relative to the capacity provided for by the layer limit. Thus, embodiments in which a constant layer limit is used may fail to take channel capacity into consideration.

Accordingly, it may be advantageous for particular embodiments to dynamically change the MU-MIMO layer limit, e.g., in dependence on hardware resource usage load and/or channel capacity. According to one or more such embodiments, the base station 100 performs hardware cost estimation for every scheduling interval (e.g., subframe, slot) and tracks the cost estimate across scheduling intervals. The base station 100 further tracks the measured channel capacity for different number of layers in the MU MIMO group, and selects a MU MIMO layer limit such that cost estimates are below an acceptable threshold and depends on how much channel capacity is available.

Figure 4:
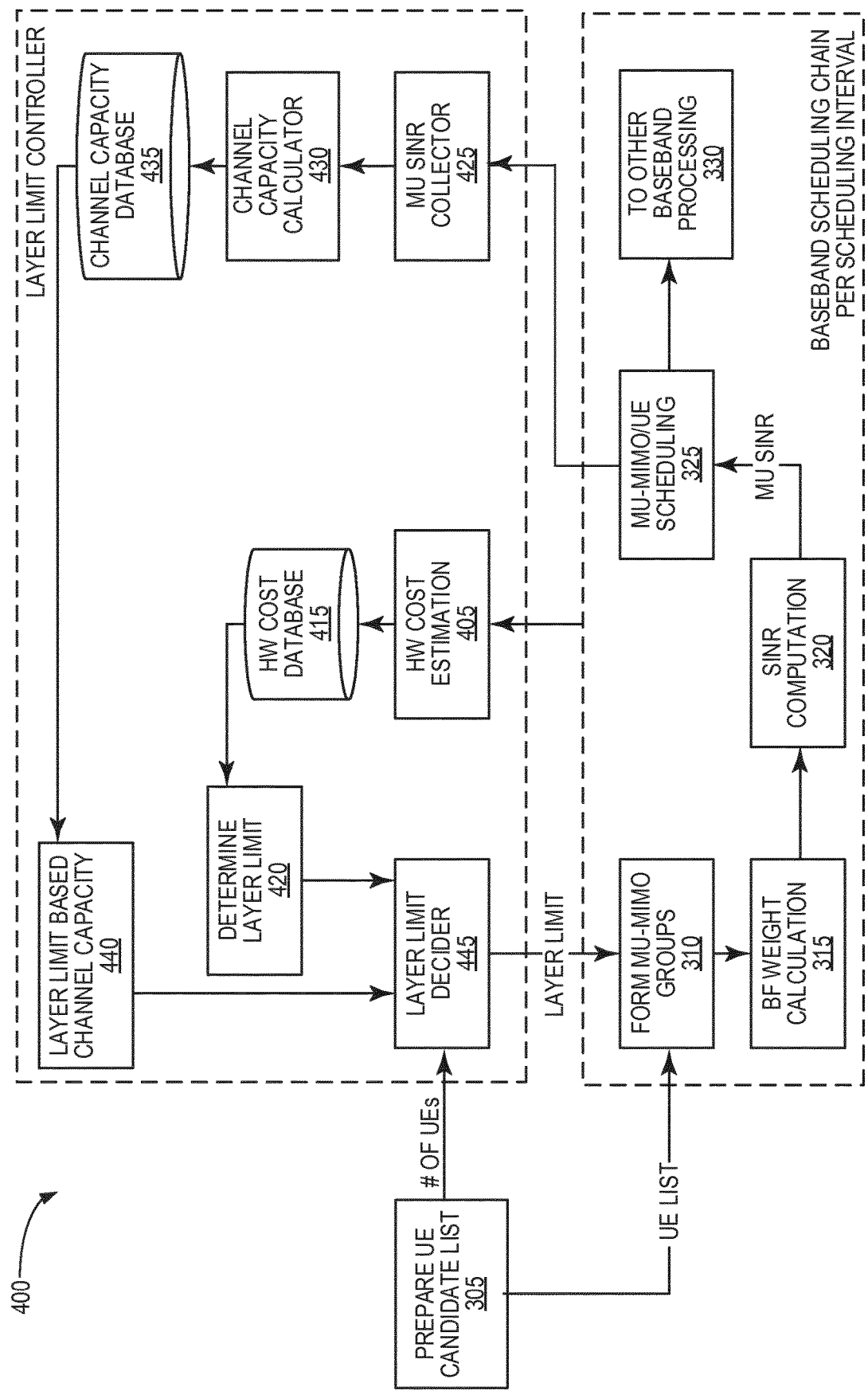

In view of the above, FIG. 4 illustrates an enhanced example scheduling flow 400 of the communication network 10 in which layer limit control is implemented. As discussed above, layer limit control may be based on hardware cost estimation and/or channel conditions. In the particular example of FIG. 4, layer limit control is based on both hardware cost estimation (block 405) and the SINR computed each scheduling interval (block 320).

Cost estimation is performed for a given baseband architecture. The baseband architecture usually comprises multiple baseband boards (B). Each baseband board comprises "n" number of Digital Signal Processors (DSPs). Therefore, the total number of DSPs (N) in the baseband architecture is found by the formula N=B×n. Accordingly, the cost estimation formulas below may be used to calculate hardware cost in terms of number of DSPs used for the baseband processing.

In particular, hardware cost estimation (block 405) may comprise calculating the average total time the DSPs were kept busy for processing the baseband signal, as shown in FIG. 5. The cost estimation is done every scheduling interval (e.g., sub-frame/slot). In particular embodiments, the cost is an average cost across multiple scheduling intervals.

For example, the cost estimation (CE) may be calculated based entirely or mainly on two parts, which are added together. The first part may be the DSP Run Time (RT) (i.e., the summation of the actual run time of the DSPs). The second part may be the DSP Load Time (LT) (i.e., the summation of the load time of the DSPs). Accordingly, CE may be determined according to the formulation, CE=RT+LT, wherein:

$$RT = \sum_{d=0}^{N-1} \sum_{k=0}^{K_d-1} RT_{d,k};$$

$$LT = \sum_{d=0}^{N-1} LT_d;$$

$LT_d$ is the program load time of DSP d (e.g., in microseconds (μs)).

$K_d$ is the number of threads of DSP d.

$RT_{d,k}$ is the run time of DSP d and thread k, which may be calculated based on the DSP cycles taken for each thread k for a given DSP d, according to the formula $RT_{d,k} = clk_{d,k}/F_d$, wherein:

$clk_{d,k}$ is the number of clock cycles taken to run a thread on DSP d and thread k; and $F_d$ is the clock frequency of DSP d.

Some embodiments calculate a filtered cost estimate by maintaining a running average of the hardware cost ($CE_{avg}$). To compute this running average, $CE_{avg}$ may be set to the CE calculated for an initial scheduling interval, i.e., $CE_1$. For subsequent scheduling intervals, if the CE of a given scheduling interval CE is above a minimum hardware cost threshold (MIN_HW_COST) (i.e., if $CE_i$>MIN_HW_COST), then $CE_{avg}=(CE_{avg}+CE_i)/2$. Otherwise, the $CE_{avg}$ is unaffected. Thus, in such embodiments, scheduling intervals in which there is little-to-no UE scheduling is performed does not affect the running average. Once computed, the running average may be stored in a database, as shown in FIG. 4 (block 415).

With further respect to FIG. 4, for each scheduling interval, an MU-MIMO layer limit may be determined (block 420) based on the HW cost, e.g., with an intent to keep cost within an acceptable cost ($CE_{acceptable}$), which may be viewed as a cost that is below the total capacity of the system ($CE_{capacity}$) by a certain safety margin ($CE_{safety}$) (i.e., in some embodiments, below a $CE_{acceptable}$ computed according to $CE_{acceptable}=CE_{capacity}-CE_{safety}$). This safety margin may be, in some embodiments, a tunable parameter (e.g., expressed in µs).

For example, for an initial scheduling interval, the lowest supported number of layers for MU-MIMO may be selected. Traditionally, this is two layers (i.e., $LayerLimit_{cost}=2$). For subsequent intervals, if the $CE_{avg}$ is currently below the acceptable CE threshold, then the layer limit is increased by a given step size (LAYER_STEP_SIZE). That is, if ($CE_{avg}<CE_{acceptable}$), then $LayerLimit_{cost}$ $LayerLimit_{cost}$+ LAYER_STEP_SIZE.

Otherwise, whether or not the layer limit is changed may depend on a CE based on total capacity ($CE_{capacity}$) (e.g., computed according to $CE_{capacity}=N*T$, wherein N is the number of DSPs in the system (as discussed above) and T is the minimum scheduling interval (e.g., 1000 µs in LTE, 500 µs in NR)). For example, if $CE_{avg}$ is above the CE acceptability threshold and below the total capacity of the system, then the layer limit may remain unchanged. That is, if (($CE_{avg}>CE_{acceptable}$) and ($CE_{avg}<CE_{capacity}$)), then $LayerLimit_{cost}=LayerLimit_{cost}$.

In yet other scenarios, the layer limit may be changed responsive to $CE_{avg}$ exceeding the total capacity of the system (e.g., reduced by the aforementioned LAYER_STEP_SIZE). Thus, in some embodiments, if ($CE_{avg}>CE_{capacity}$), then $LayerLimit_{cost}=LayerLimit_{cost}-$ LAYER_STEP_SIZE.

Figure 6A:
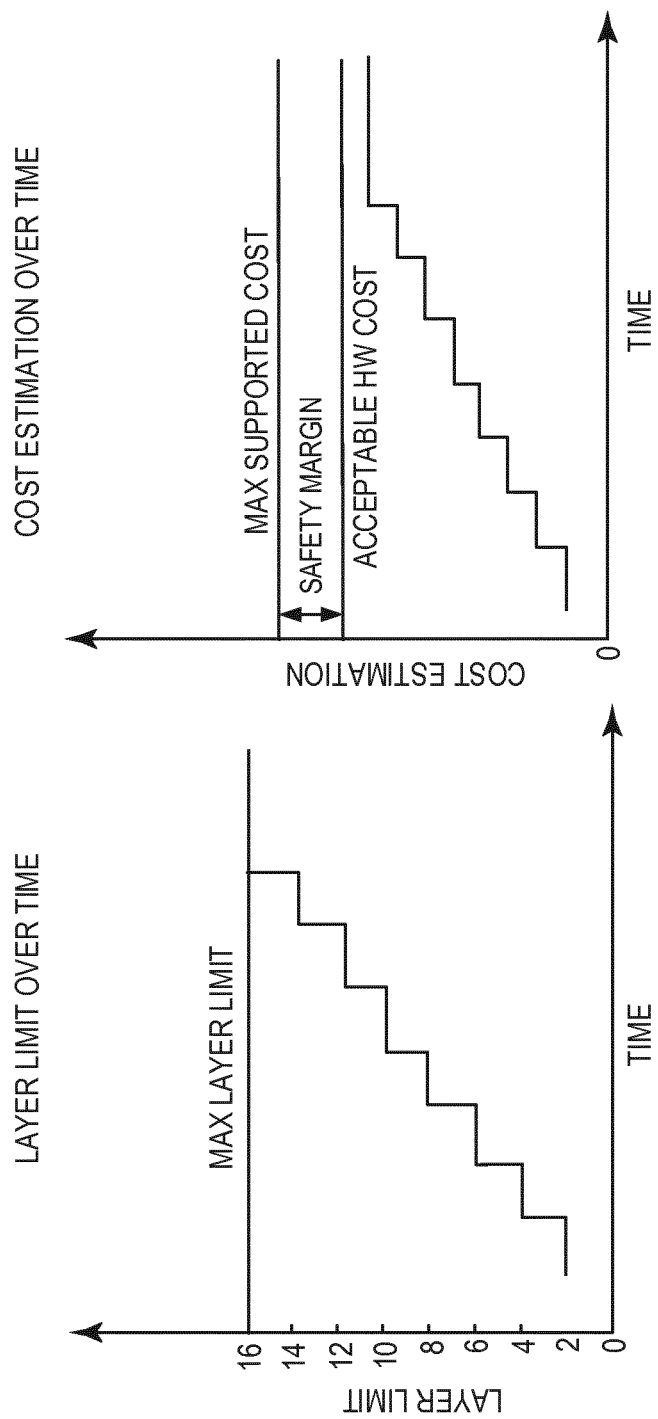
FIGS. 6A, 6B and 6C are graphs illustrating examples of controlling the layer limit based on hardware cost estimation, according to one or more embodiments of the present disclosure.
Figure 6B:
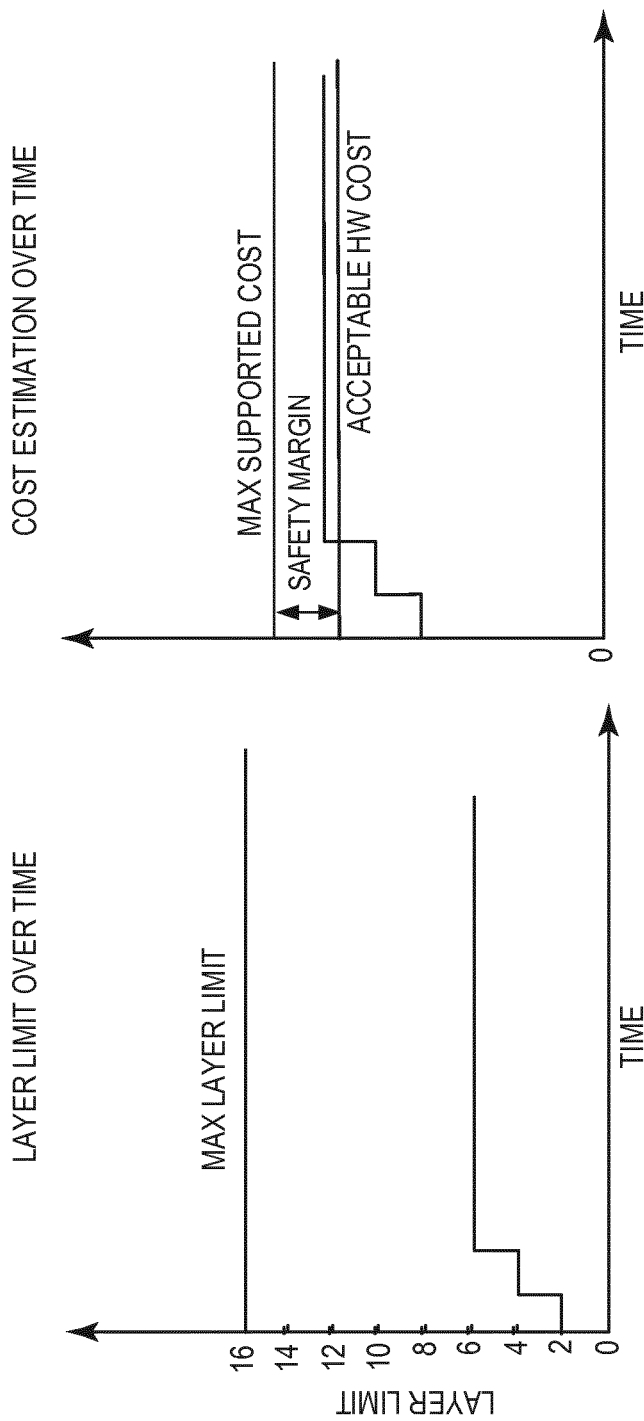
Figure 6C:
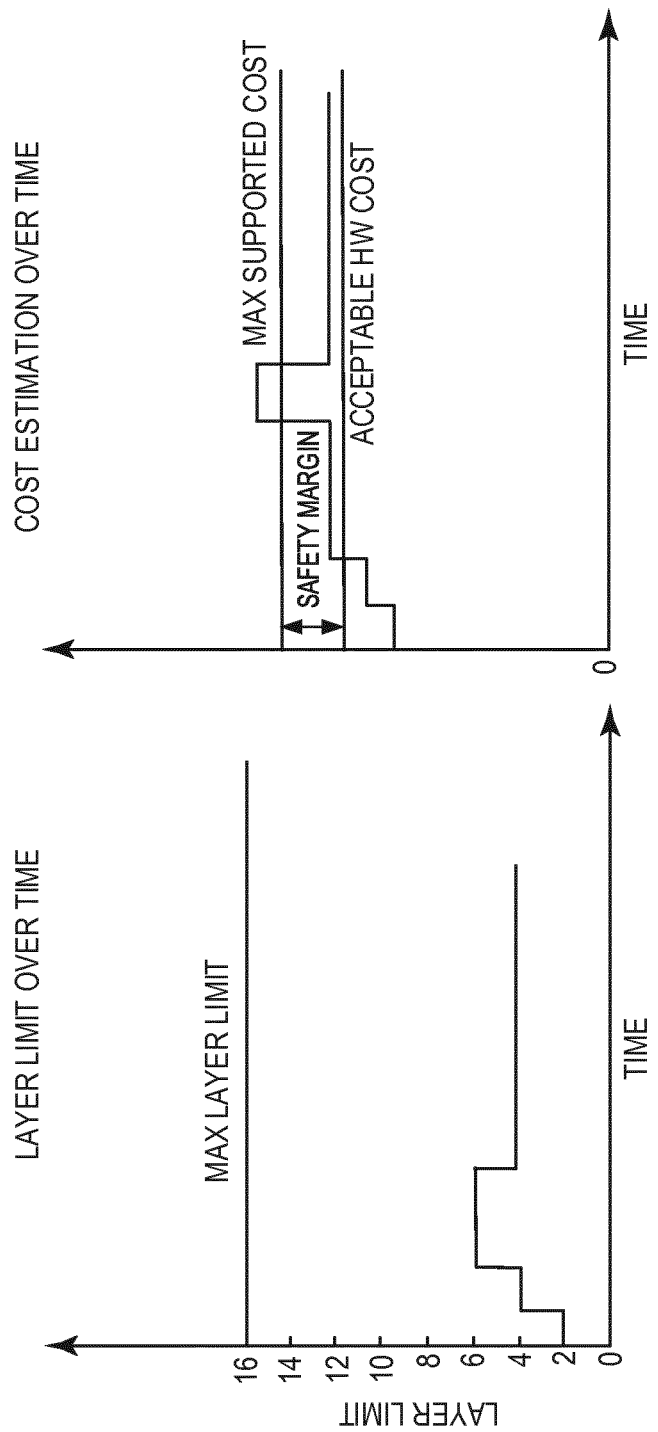

Each of FIGS. 6A through 6C illustrates an example in which the layer limit is calculated (and may further be controlled for use in scheduling) based on hardware cost estimation computations performed each scheduling interval. If the hardware cost is less than the acceptable cost, the layer limit is increased by the step size. If the hardware cost is between the hardware capacity cost and the acceptable hardware cost, the layer limit is not changed. If the hardware cost is above the capacity cost, the layer limit is decreased by the step size.

More specifically, FIG. 6A illustrates an example of controlling the MU-MIMO layer limit. In the example of FIG. 6A, the layer limit is incremented responsive to the cost estimation being below an acceptable hardware cost threshold. In this particular example, the layer limit is initially set to two (e.g., $LayerLimit_{cost}=2$), and incremented by two (e.g., LAYER_STEP_SIZE=2) each time the calculated cost estimation is determined to be less than the acceptable hardware cost (e.g., each time $CE_{avg}$ is determined to be less than $CE_{acceptable}$) until a maximum layer limit threshold is reached. In this example, the maximum layer limit is 16. Although the cost estimation is below the acceptable hardware cost even when the layer limit is 16, the layer limit cannot be further increased because a maximum layer limit is set. Further, because the cost estimation does not exceed a total capacity of the system (e.g., $CE_{capacity}$), the layer limit is not decremented.

FIG. 6B illustrates a different example of controlling the MU-MIMO layer limit. In the example of FIG. 6B, the layer limit is incremented responsive to the cost estimation being below the acceptable hardware cost threshold, in similar fashion as the example of FIG. 6A. However, in contrast to the example of FIG. 6A, when the layer limit is set to six in the example of FIG. 6B, the cost estimation exceeds the acceptable hardware cost. In particular, at a layer limit of six, the cost estimation is determined to be within a safety margin from the maximum hardware cost supported by the system (e.g., at $LayerLimit_{cost}=6$, $CE_{avg}$ does not exceed $CE_{capacity}$, but exceeds $CE_{acceptable}$ by less than $CE_{safety}$). While the cost estimation is within the safety margin, the layer limit is maintained, e.g., to prevent increases that might increase the cost estimation above total capacity. Thus, in this example, the layer limit is maintained at less than the maximum layer limit of 16.

FIG. 6C illustrates a different example of controlling the MU-MIMO layer limit. In the example of FIG. 6C, the layer limit is incremented responsive to the cost estimation being below the acceptable hardware cost threshold, and decremented responsive to the cost estimation being above the total hardware capacity cost.

Returning to FIG. 4, as briefly discussed above, the layer limit may also be based on SINR information. An MU SINR collector (block 425) may be implemented to collect an MU SINR set $MU\_SINR_m$ that contains the SINR information for each of the UEs 200 of a given MU group m. Thus, according to particular embodiments, $MU\_SINR_m=(SINR_0, SINR_1, \ldots SINR_{L-1})$, wherein $SINR_i$ is the SINR of layer l, L is the total number of layers in the MU group m, and $MU\_SINR_m$ is the MU SINR set for MU group m.

Channel capacity for a given MU MIMO group m may be calculated (block 430) by summing the channel capacity of the UEs 200 in that MU MIMO group, e.g., according to the formula $$CC_m = \sum_{l=0}^{L-1} CC_l,$$

wherein $CC_m$ is the channel capacity of MU group m, $CC_l$ is the channel capacity of layer l in the MU group, and L is the total number of layers in the MU group.

The $CC_l$ is the channel capacity of the layer l in the MU MIMO group, and is calculated based on the SINR of the layer. In some embodiments, the $CC_l$ is also calculated based on the bandwidth of the system. For example, $CC_l$ may be calculated, in some embodiments, according to the formula $CC_l=B*\log_2(1+SINR_l)$, wherein B is the system bandwidth and $SINR_l$ is the SINR of layer l.

To filter out the channel capacity across a plurality of scheduling intervals, a running average may be maintained to get the average channel capacity for a given MU group m. For example, the average channel capacity ($avgCC_m$) may be set to CCm for a first scheduling interval, and for subsequent intervals may be calculated by averaging the previously computed average with a new CCm according to the formula $avgCC_m=(avgCC_m+CC_m)/2$. These averages, once computed, may be stored in a channel capacity database (block 435).

The channel capacity database may contain the average channel capacity for different MU groups (e.g., groups with different numbers of layers in it). The average channel capacity may then be sorted (e.g., by channel capacity, from highest to lowest), as shown in the table of FIG. 7.

Thus, the channel capacity database may comprise the MU group that has the maximum average channel capacity at the top of the table. The layer limit based on channel capacity ($LayerLimit_{cc}$) may be taken from the number of layers in the MU group that is highest in the channel capacity table (block 440).

According to embodiments in which a layer limit is computed based on hardware cost (e.g., $LayerLimit_{cost}$, described above) and another layer limit is computed based on channel capacity (e.g., $LayerLimit_{cc}$, described above), the final layer limit may be calculated based on the two layer limits (block 445). For example, the final layer limit may be calculated as the lesser of the two layer limits, according to the formula LayerLimit=Min (LayerLimit$_{cost}$, LayerLimit$_{cc}$). In some embodiments, the number of UEs 200 may also be considered in determining the final layer limit. Once the final layer limit has been determined, baseband scheduling may be performed as discussed above (blocks 305, 310, 315, 320, 325, 330).

Figure 8:
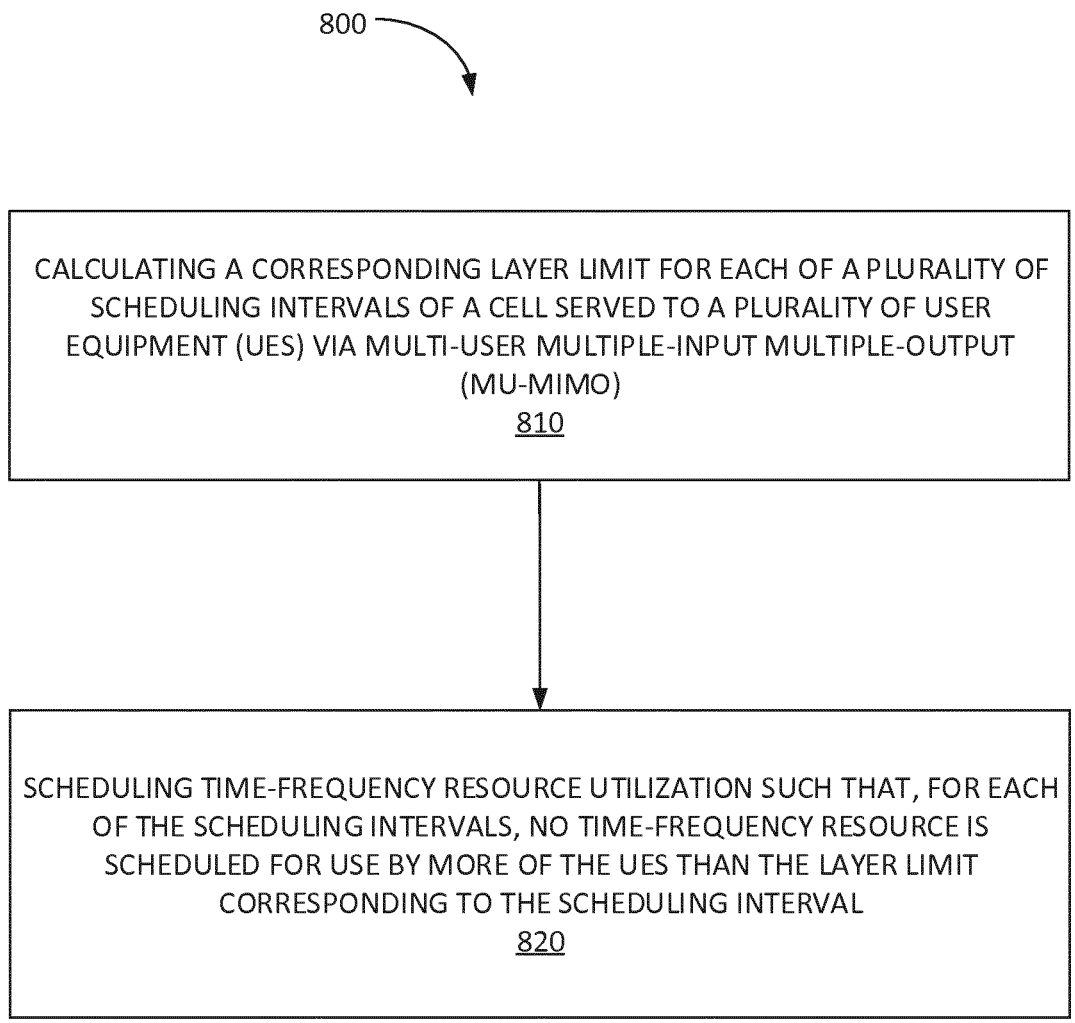
FIG. 8 is a flow diagram illustrating an example method according to one or more embodiments of the present disclosure.

In view of all of the above, particular embodiments of the present disclosure include a method 800 implemented by a network node 700, as shown in the example of FIG. 8. The method comprises calculating a corresponding layer limit for each of a plurality of scheduling intervals of a cell 20 served to a plurality of UEs 200 via MU-MIMO. The method further comprises scheduling time-frequency resource utilization such that, for each of the scheduling intervals, no time-frequency resource is scheduled for use by more of the UEs 200 than the layer limit corresponding to the scheduling interval.

Other embodiments are directed to an example network node 700 according to particular embodiments of the present disclosure. The network node 700 of FIG. 9 comprises processing circuitry 710 and interface circuitry 730. The processing circuitry 710 is communicatively coupled to the interface circuitry 730, e.g., via one or more buses. In some embodiments, the network node 700 further comprises memory circuitry 720 that is communicatively coupled to the processing circuitry 710, e.g., via one or more buses. According to particular embodiments, the processing circuitry 710 is configured to perform one or more of the methods described herein (e.g., the method 200 of FIG. 8).

The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions of a computer program 760 stored in the memory circuitry 720 whereby the processing circuitry 710 is configured. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the network node 700. Such I/O data paths may include data paths for exchanging signals over a communications network, data paths for exchanging signals with a user, and/or data paths for exchanging data internally among components of the network node 700. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry. The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise transmitter circuitry 740 configured to send communication signals over a communications network and receiver circuitry 750 configured to receive communication signals over the communications network. Similarly, the interface circuitry 730 may comprise a display and/or keyboard. Other embodiments may include other permutations and/or arrangements of the above and/or their equivalents.

Figure 9:
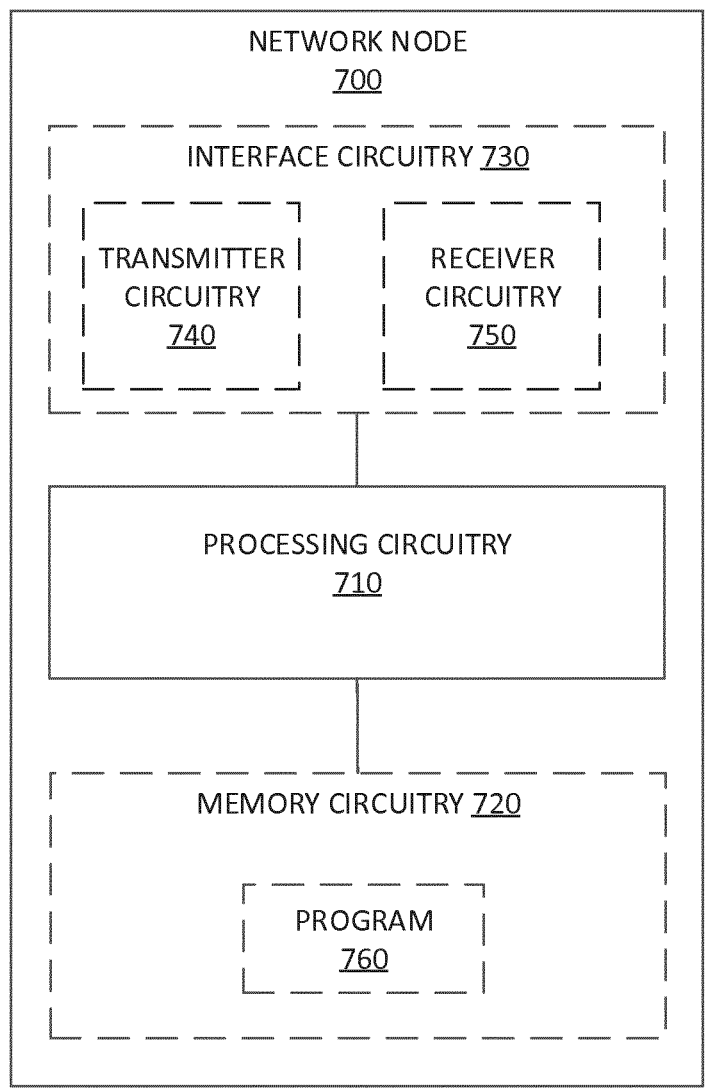
FIG. 9 is a schematic block diagram illustrating an example network according to one or more embodiments of the present disclosure.

According to embodiments of the network node 700 illustrated in FIG. 9, the processing circuitry 710 is configured to calculate a corresponding layer limit for each of a plurality of scheduling intervals of a cell 20 served to a plurality of user equipment (UEs) via multi-user multiple-input multiple-output (MU-MIMO). The processing circuitry 710 is further configured to schedule time-frequency resource utilization such that, for each of the scheduling intervals, no time-frequency resource is scheduled for use by more of the UEs 200 than the layer limit corresponding to the scheduling interval.

Other embodiments of the present disclosure include corresponding computer programs. The computer program comprises instructions which, when executed on processing circuitry of a network node 700, cause the network node 700 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 10:
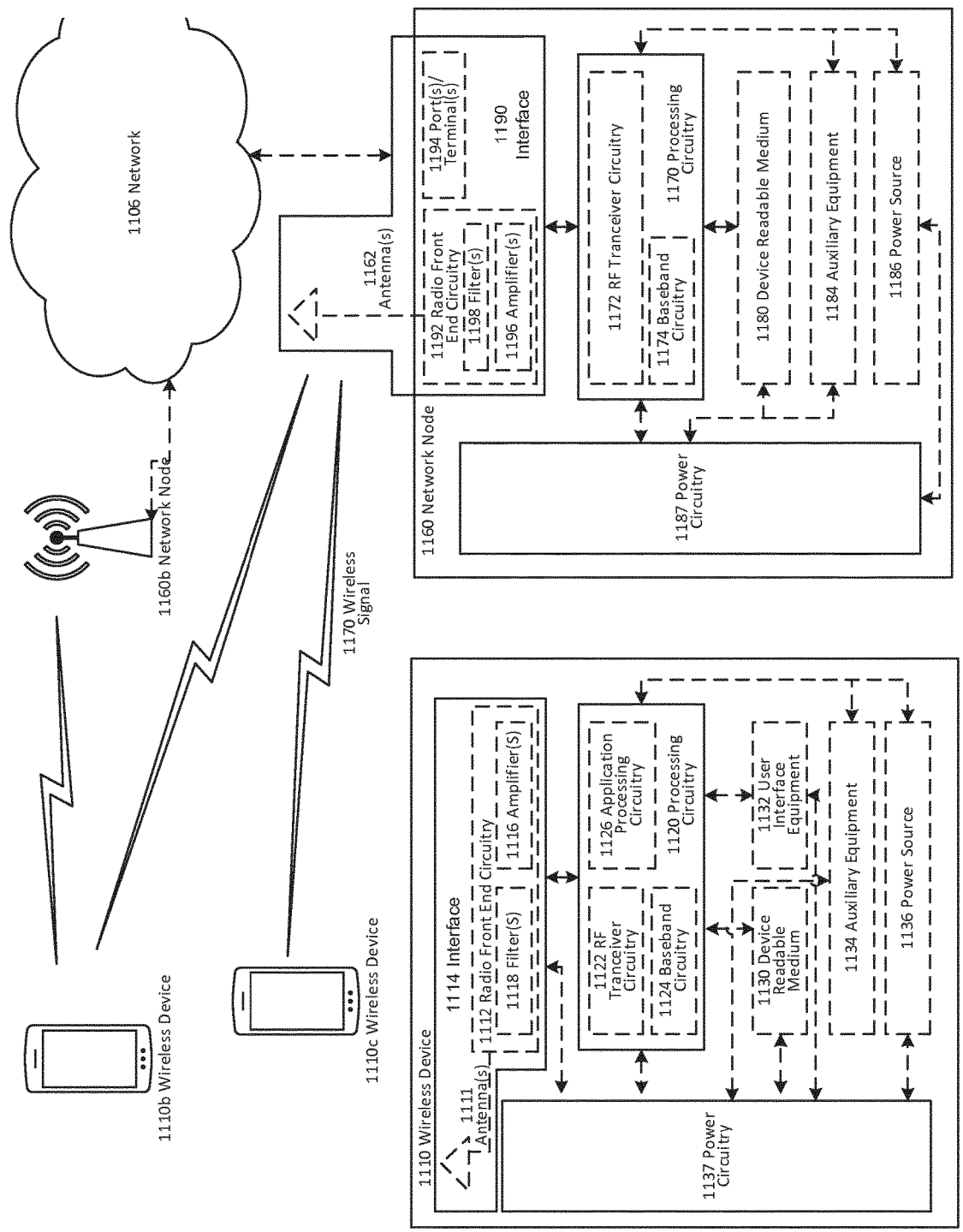
FIG. 10 is a schematic block diagram illustrating an example wireless network, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 10 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 11:
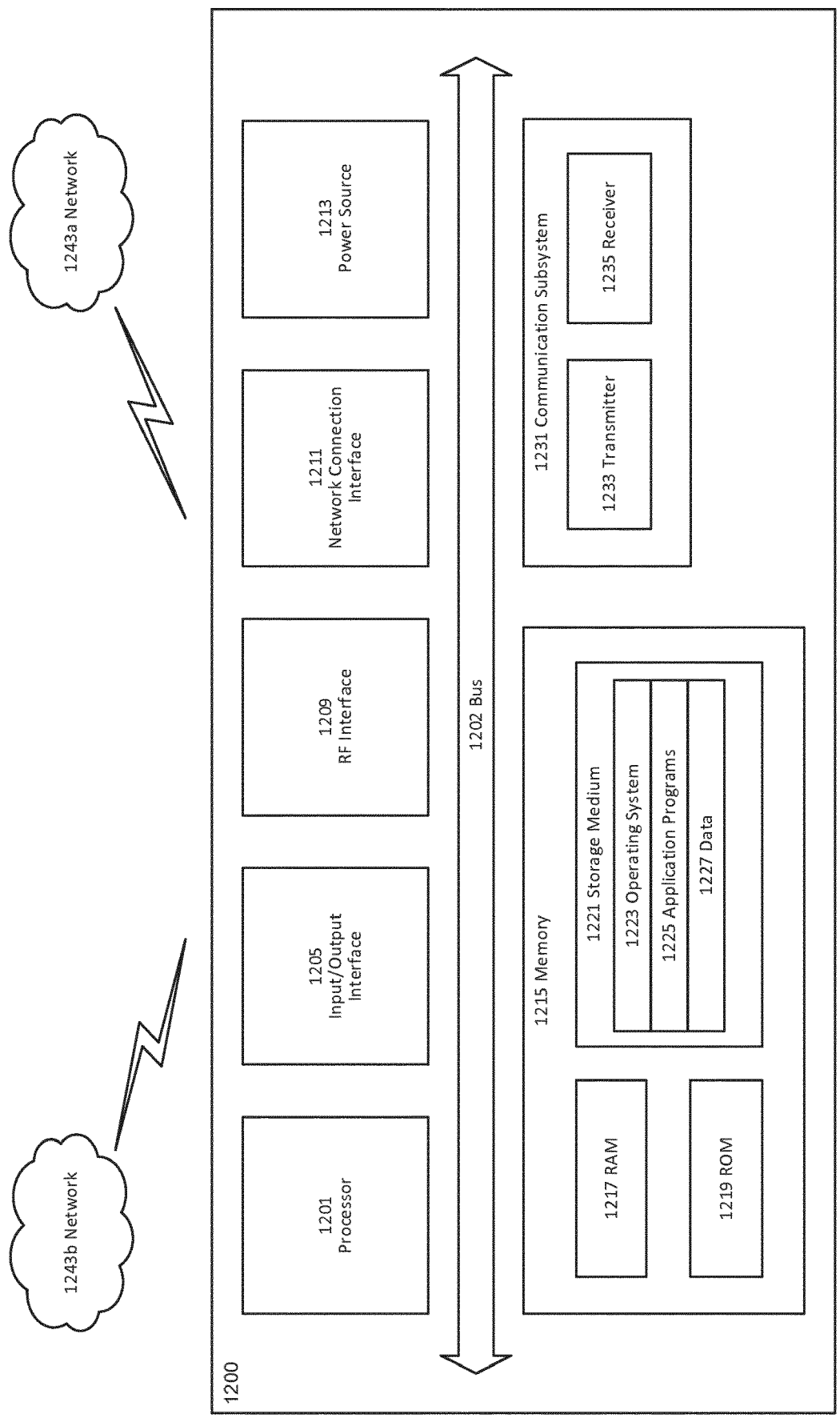
FIG. 11 is a schematic block diagram illustrating an example UE, according to one or more embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 11, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 12:
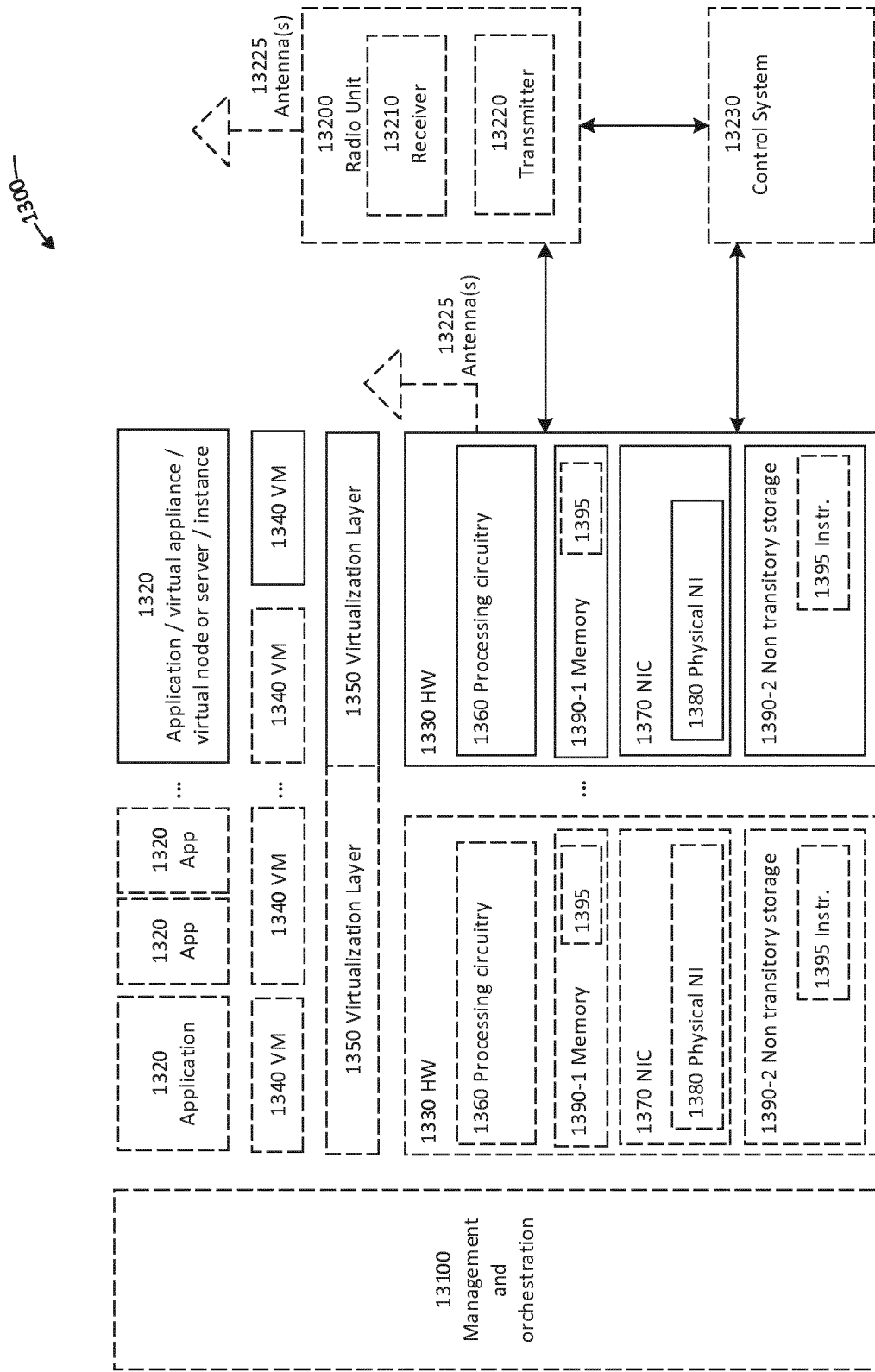
FIG. 12 is a schematic block diagram illustrating an example of a virtualization environment, according to one or more embodiments of the present disclosure.

FIG. 12 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 12, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 12.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 13:
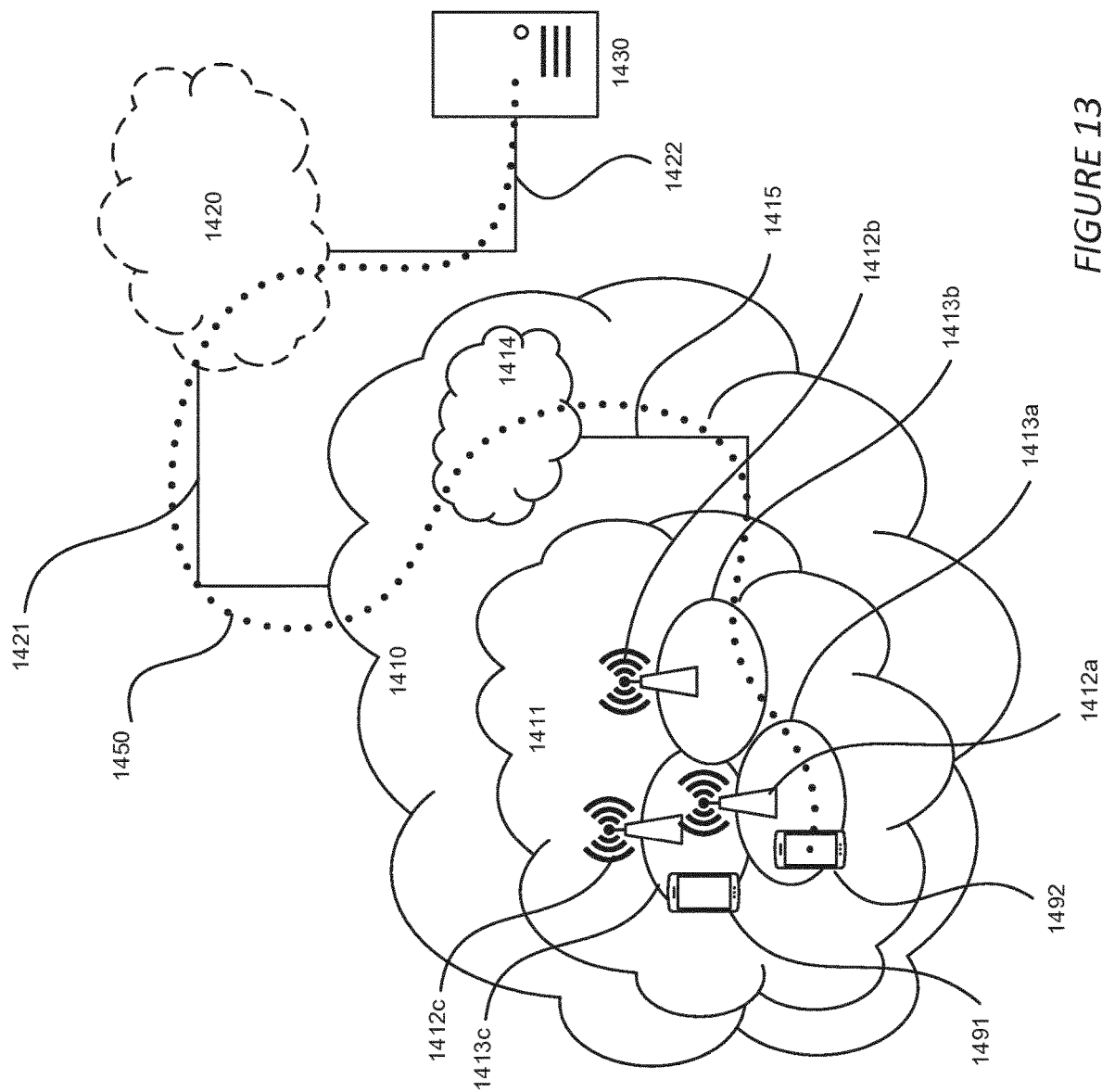
FIG. 13 is a schematic illustrating an example telecommunication network, according to one or more embodiments of the present disclosure.

FIG. 13 illustrates a telecommunication network connected via an intermediate network to a host computer in accordance with some embodiments. In particular, with reference to FIG. 13, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 13 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 14:
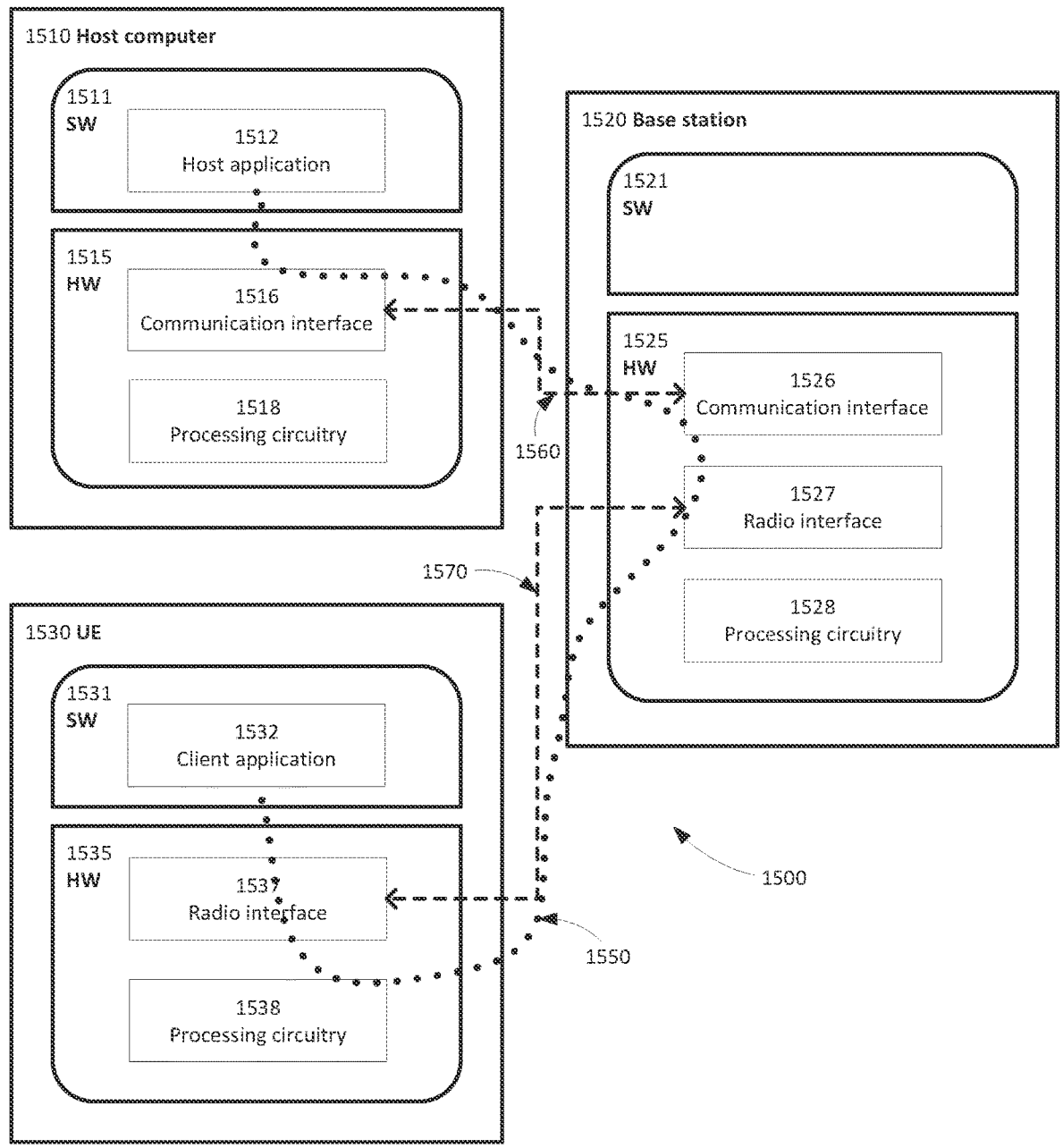
FIG. 14 is a schematic block diagram illustrating an example communication system, according to one or more embodiments of the present disclosure.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 14) served by base station 1520. Communication interface 1526 may be configured to facilitate connection 1560 to host computer 1510. Connection 1560 may be direct or it may pass through a core network (not shown in FIG. 14) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 14 may be similar or identical to host computer 1430, one of base stations 1412*a*, 1412*b*, 1412*c* and one of UEs 1491, 1492 of FIG. 13, respectively. This is to say, the inner workings of these entities may be as shown in FIG. 14 and independently, the surrounding network topology may be that of FIG. 13.

In FIG. 14, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may [add technical effect] and thereby provide benefits such [add advantages].

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 15:
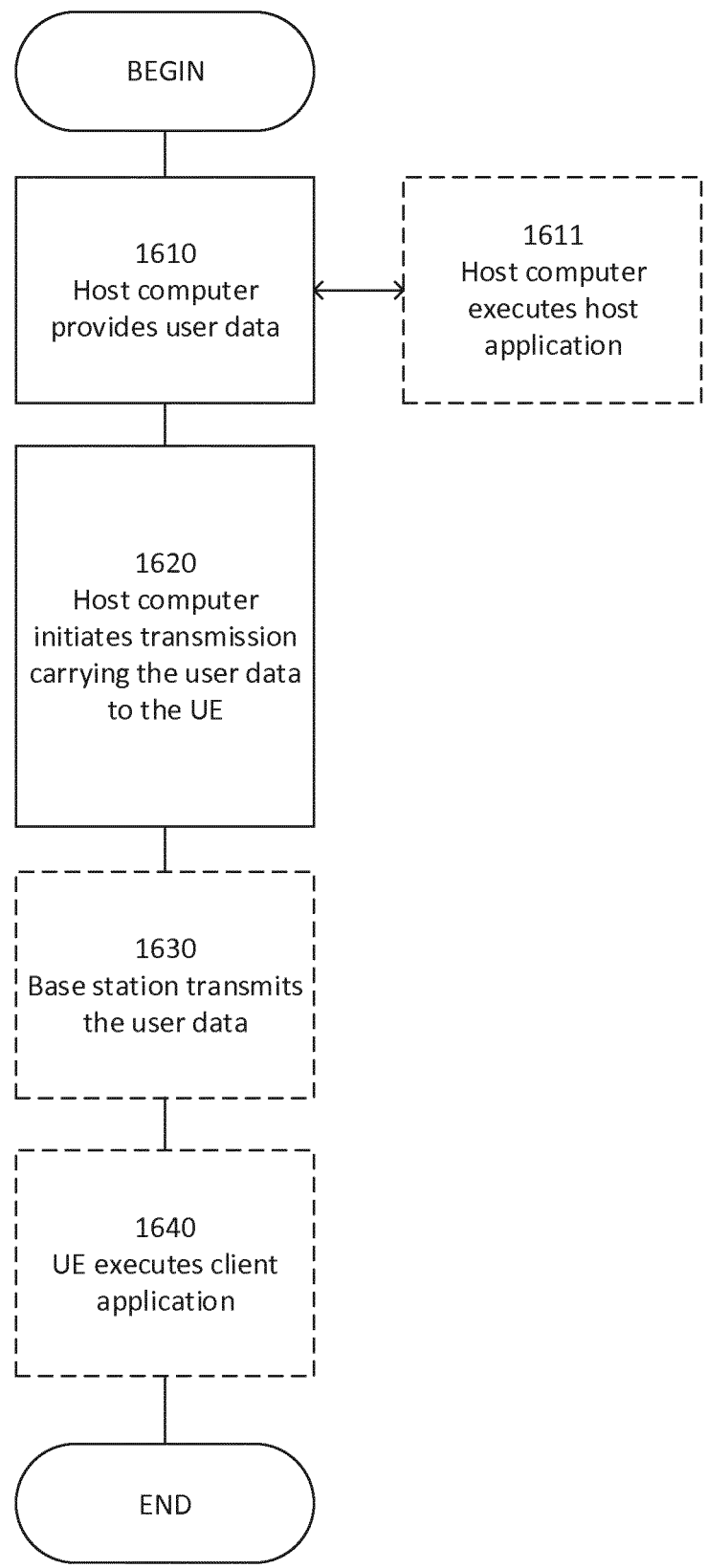
FIGS. 15-18 are flow diagrams, each of which illustrates an example method, according to particular embodiments of the present disclosure.

FIG. 15 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 15 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 16:
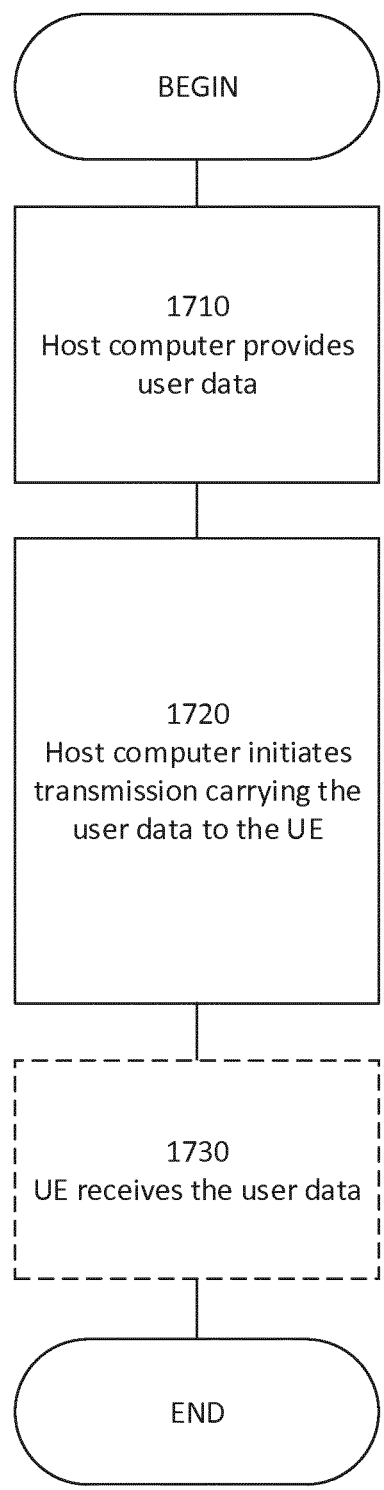

FIG. 16 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 16 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 17:
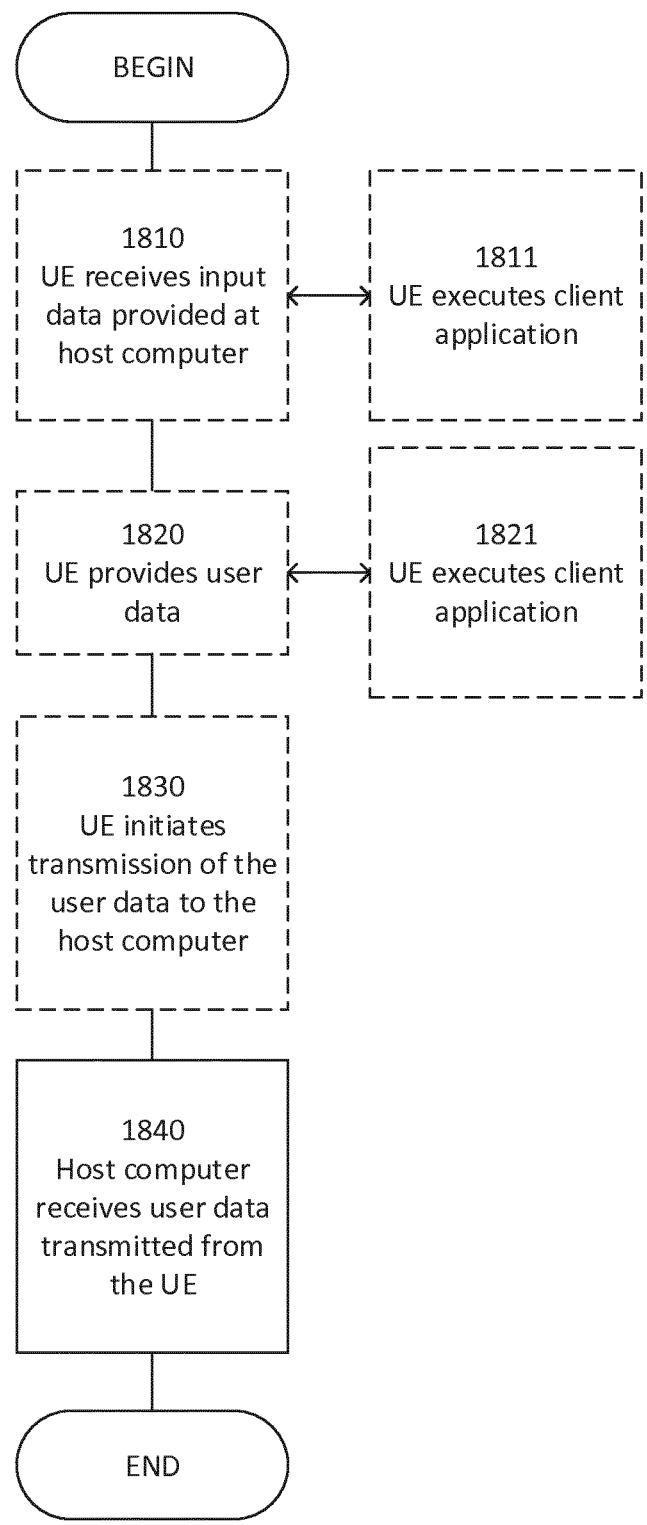

FIG. 17 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 17 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 18:
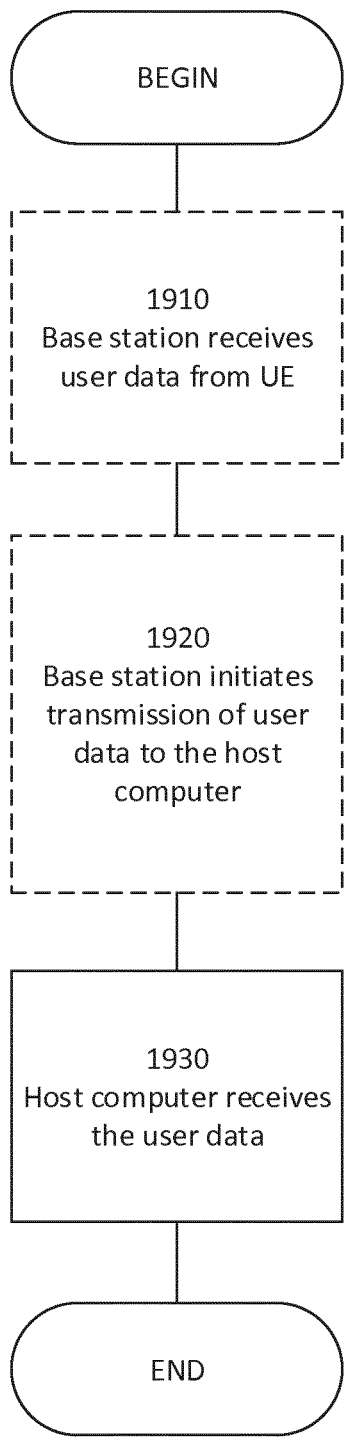

FIG. 18 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 18 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of wireless communication scheduling implemented by a network node, the method comprising:
calculating a corresponding layer limit for each of a plurality of scheduling intervals of a cell served to a plurality of user equipment (UEs) via multi-user multiple-input multiple-output (MU-MIMO), the calculating comprising determining, for each of one or more of the scheduling intervals previous to a given scheduling interval, a corresponding hardware utilization of the network node during the previous scheduling interval; and
scheduling time-frequency resource utilization such that, for each of the scheduling intervals, no time-frequency resource is scheduled for use by more layers directed to the plurality of UEs than the corresponding layer limit for the scheduling interval.

2. The method of claim 1, wherein calculating the corresponding layer limit of the given scheduling interval further comprises taking a running average of at least a subset of the hardware utilizations corresponding to the previous scheduling intervals.

3. The method of claim 1, wherein calculating the corresponding layer limit of the given scheduling interval further comprises determining a channel capacity of a MU-MIMO group.

4. A network node comprising:
processing circuitry and memory, the memory containing instructions executable by the processing circuitry whereby the network node is configured to:
calculate a corresponding layer limit for each of a plurality of scheduling intervals of a cell served to a plurality of user equipments (UEs) via multi-user multiple-input multiple-output (MU-MIMO), wherein to calculate the corresponding layer limit, the processing circuitry is configured to determine, for each of one or more of the scheduling intervals previous to a given scheduling interval, a corresponding hardware utilization of the network node during the previous scheduling interval; and
schedule time-frequency resource utilization such that, for each of the scheduling intervals, no time-frequency resource is scheduled for use by more layers directed to the plurality of UEs than the corresponding layer limit for the scheduling interval.

5. The network node of claim 4, wherein to calculate the corresponding layer limit of the given scheduling interval, the processing circuitry is further configured to take a running average of at least a subset of the hardware utilizations corresponding to the previous scheduling intervals.

6. The network node of claim 5, wherein to calculate the corresponding layer limit of the given scheduling interval the processing circuitry is further configured to omit, from the running average of the hardware utilizations, each of the hardware utilizations that are below a minimum threshold and which correspond to a different one or more of the previous scheduling intervals.

7. The network node of claim 5, wherein to calculate the corresponding layer limit of the given scheduling interval the processing circuitry is further configured to increment the layer limit corresponding to the scheduling interval immediately previous to the given scheduling interval by a predefined step size in response to the running average of the hardware utilizations being below a cost threshold.

8. The network node of claim 5, wherein to calculate the corresponding layer limit of the given scheduling interval the processing circuitry is further configured to decrement the layer limit corresponding to the scheduling interval immediately previous to the given scheduling interval by a predefined step size in response to the running average of the hardware utilizations being above a cost threshold.

9. The network node of claim 5, wherein to calculate the corresponding layer limit of the given scheduling interval the processing circuitry is further configured to maintain the layer limit corresponding to the scheduling interval immediately previous to the given scheduling interval in response to the running average of the hardware utilizations being above a first cost threshold and below a second cost threshold.

10. The network node of claim 4, wherein to determine the corresponding hardware utilization of at least one of the previous scheduling intervals the processing circuitry is configured to determine a run time and/or load time of a digital signal processor of the network node.

11. The network node of claim 4, wherein to determine the corresponding hardware utilization of at least one of the previous scheduling intervals the processing circuitry is configured to sum run times and load times of a plurality of digital signal processors of the network node.

12. The network node of claim 4, wherein to calculate the corresponding layer limit of the given scheduling interval the processing circuitry is further configured to determine a channel capacity of a MU-MIMO group.

13. The network node of claim 12, wherein to determine the channel capacity of the MU-MIMO group the processing circuitry is configured to determine a signal to noise ratio (SINR) for each layer of the MU-MIMO group.

14. The network node of claim 13, wherein to determine the channel capacity of the MU-MIMO group the processing circuitry is further configured to determine a capacity of each layer of the MU-MIMO group based on the SINR of the layer.

15. The network node of claim 12, wherein to determine the channel capacity of the MU-MIMO group the processing circuitry is configured to calculate a capacity for each of one or more scheduling intervals previous to the given scheduling interval and taking a running average of the capacities.

16. The network node of claim 15, wherein to determine the channel capacity of the MU-MIMO group the processing circuitry is further configured to:
store the running average in association with the MU-MIMO group and number of layers in the MU-MIMO group in a database of average channel capacities and respective MU-MIMO groups;
compare the running average of the MU-MIMO group to the average channel capacities of the other MU-MIMO groups; and
identify the running average as the highest of the channel capacities in the database.

17. The network node of claim 4, wherein to calculate the corresponding layer limit of the given scheduling interval the processing circuitry is further configured to determine a cost-based layer limit and a capacity-based layer limit and select the lesser of the cost-based and capacity-based layer limits as the layer limit corresponding to the given scheduling interval.

18. The network node of claim 4, wherein the scheduling interval is one slot in duration or the scheduling interval is one subframe in duration.

19. The network node of claim 4, wherein scheduling intervals are contiguous.

20. The network node of claim 4, wherein scheduling intervals are discontiguous.

21. A computer readable storage medium containing a computer program, wherein the computer program comprises instructions which, when executed on processing circuitry of a network node, cause the processing circuitry to:
calculate a corresponding layer limit for each of a plurality of scheduling intervals of a cell served to a plurality of user equipment (UEs) via multi-user multiple-input multiple-output (MU-MIMO), wherein to calculate the corresponding layer limit the processing circuitry is caused to determine, for each of one or more of the scheduling intervals previous to a given scheduling interval, a corresponding hardware utilization of the network node during the previous scheduling interval; and
schedule time-frequency resource utilization such that, for each of the scheduling intervals, no time-frequency resource is scheduled for use by more layers directed to the plurality of UEs than the corresponding layer limit for the scheduling interval.

* * * * *